United States Patent [19]
Wippler

[11] Patent Number: 5,129,603
[45] Date of Patent: Jul. 14, 1992

[54] AIRCRAFT CONTROL LOCKING APPARATUS

[76] Inventor: Lawrence J. Wippler, Box 3217 GF A.F.B., Grand Forks, N. Dak. 58207

[21] Appl. No.: 683,737

[22] Filed: Apr. 11, 1991

[51] Int. Cl.⁵ .................................... B64C 13/14
[52] U.S. Cl. ................................. 244/224; 70/202; 70/207; 70/211; 70/226; 70/238; 74/495
[58] Field of Search ................ 70/209-212, 70/225, 226, 237, 238, 207, 198-203; 74/495; 244/224, 1 R

[56] References Cited

U.S. PATENT DOCUMENTS

| | | | |
|---|---|---|---|
| 1,228,603 | 6/1917 | Sabah | 74/495 X |
| 1,320,254 | 10/1919 | McFarland | 74/495 |
| 1,320,557 | 11/1919 | Koepke | 74/495 |
| 1,436,773 | 11/1922 | Moore | 74/495 X |
| 2,035,231 | 3/1936 | Haberstro, Jr. | 244/1 R |
| 3,298,242 | 1/1967 | Smith | 74/495 |
| 3,330,504 | 7/1967 | Lewis | 244/224 |
| 3,833,190 | 9/1974 | Gaio | 244/224 |
| 3,898,823 | 8/1975 | Ludeman | 244/224 X |
| 3,971,532 | 7/1976 | Fountain | 244/224 X |
| 4,208,026 | 6/1980 | Reynolds | 244/224 |

Primary Examiner—Lloyd A. Gall
Attorney, Agent, or Firm—Richard L. Miller

[57] ABSTRACT

An aircraft control locking apparatus for a control yoke on a control shaft extending from an instrument panel in an aircraft is provided. The aircraft control locking apparatus utilizing a pair of elastic shock cords, a first mechanism for connecting an upper end of each of the elastic shock cords in a spaced apart relationship to the control yoke and a second mechanism for connecting a lower end of each of the elastic shock cords in a spaced apart relationship to a fixed point on the instrument panel below the control shaft. The control lock retains the control yoke in a neutral position, keeping the control surfaces of the aircraft from moving freely, thereby preventing damage to the aircraft stored outdoors during periods of strong gusty winds in severe weather.

3 Claims, 1 Drawing Sheet

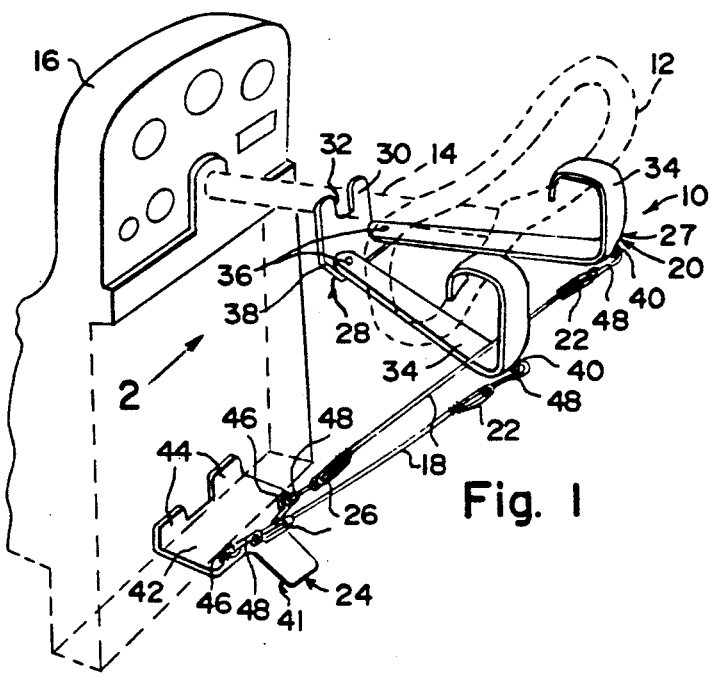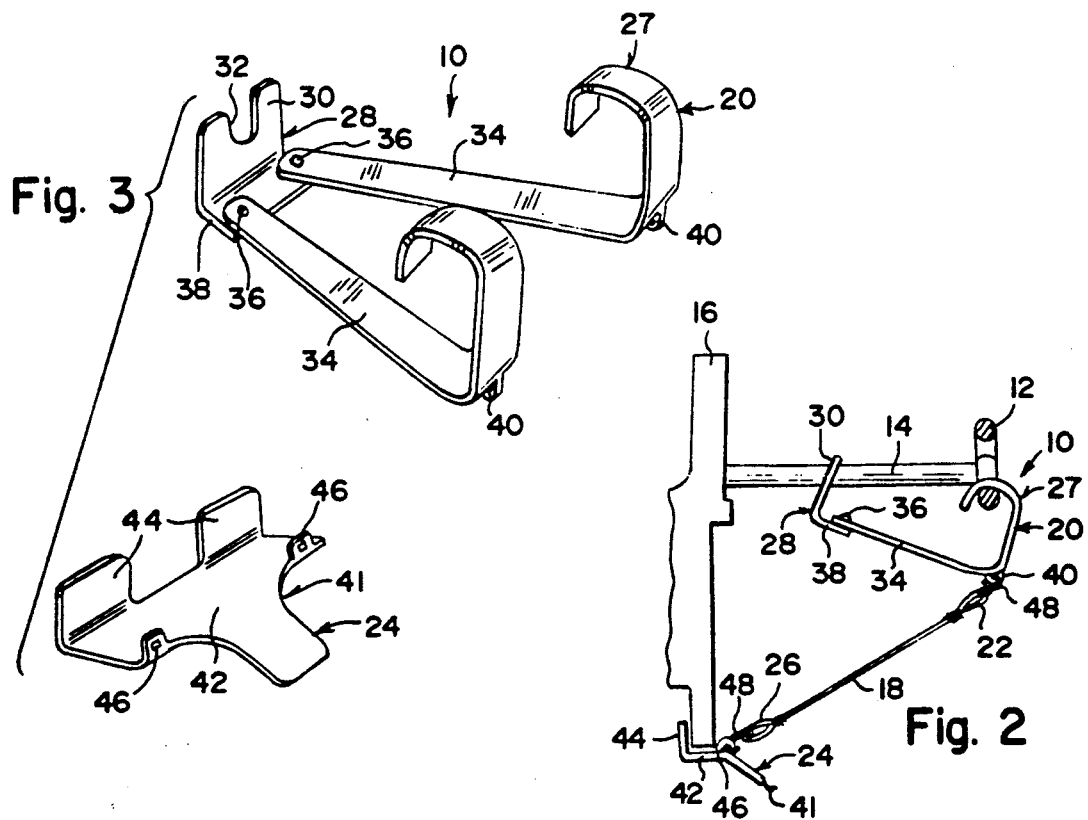

AIRCRAFT CONTROL LOCKING APPARATUS

BACKGROUND OF THE INVENTION

The instant invention relates generally to locking devices and more specifically it relates to an aircraft control lock.

Numerous locking devices have been provided in the prior art that are adapted to secure the ailerons and the horizontal stabilizers in aircraft from movement or vibration by wind and the like. For example, U.S. Pat. No. 3,330,540 to Gaio and U.S. Pat. No. 4,208,026 to Reynolds all are illustrative of such prior art. While these units may be suitable for the particular purpose to which they address, they would not be as suitable for the purpose of the present invention as hereafter described.

SUMMARY OF THE INVENTION

A primary object of the present invention is to provide an aircraft control locking apparatus that will overcome the shortcomings of the prior art devices.

Another object is to provide an aircraft control locking apparatus that will retain the control yoke in a neutral position to keep the control surfaces from moving freely, and thereby prevent damage to an aircraft stored outdoors during periods of strong gusty winds in severe weather.

An additional object is to provide an aircraft control locking apparatus which will fit all aircraft with a control yoke without the need for modifying the aircraft so that it can be installed in a few seconds.

A further object is to provide an aircraft control locking apparatus that is simple and easy to use.

A still further object is to provide an aircraft control locking apparatus that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a diagrammatic perspective view illustrating the instant invention on the controls in the cockpit of a typical aircraft;

FIG. 2 is a diagrammatic view of the instant invention taken in the direction of arrow 2 of FIG. 1; and FIG. 3 is an enlarged perspective view of the instant invention illustrating some of the individual components per se.

DETAILED DESCRIPTION OF THE PREFERRED EMBODIMENTS

Turning now descriptively to the drawings, in which like reference characters denote like elements throughout the several views, the Figures illustrate an aircraft control locking apparatus 10 for a control yoke 12 on a control shaft 14 extending from an instrument panel 16 in an aircraft. The aircraft control locking apparatus 10 consists of a pair of elastic shock cords 18. A first mechanism 20 is provided for connecting an upper end 22 of each of the elastic shock cords 18 in a spaced apart relationship to the control yoke 12. A second mechanism 24 is for connecting a lower end 26 of each of the elastic shock cords 18 in a spaced apart relationship to a fixed point on the instrument panel 16 below the control shaft 14. The control lock 10 retains the control yoke 12 in a neutral position, keeping the control surfaces of the aircraft from moving freely, thereby preventing damage to the control surfaces of an aircraft stored outdoors during periods of strong gusty winds in severe weather.

The first connecting mechanism 20 is a control yoke bracket 27 that includes an L-shaped control shaft engagement member 28 with an upstanding leg 30 having a U-shaped slot 32 therein to bear against the underside of the control shaft 14. A pair of hook-shaped members 34 are also provided to hook onto the control yoke 12, with each pivotally connected at 36 to the other leg 38 of the control shaft engagement member 28 and has an eyelet 40 for receiving the upper end 22 of one elastic shock cord 18.

The second connecting mechanism 24 is an instrument panel bracket 41 that includes a plate 42 having a pair of upwardly extending rear flanges 44 to fit under the instrument panel 16 and a pair front eyelets 46 for receiving the lower ends 26 of the elastic shock cords 18. Each elastic shock cord 18 includes a pair of hook members 48 that are each affixed to each end 22 and 26 thereof. Each hook member 48 can engage with an eyelet 40 on the control yoke bracket 27 and with an eyelet 46 on the instrument panel bracket 41.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An aircraft control locking apparatus for a control yoke on a control shaft extending from an instrument panel in an aircraft, which utilizes at least two elastic shock cords with a pair of hook members that are each affixed to an end thereof, wherein said aircraft control locking apparatus comprises:

a) a first means for connecting an upper end of each of said elastic shock cords in a spaced apart relationship to the control yoke; and b) a second means for connecting a lower end of each of said elastic shock cords in a spaced apart relationship to a fixed point on the instrument panel below the control shaft so as to retain the control yoke in a neutral position, keeping the control surfaces of the aircraft from moving freely, thereby preventing damage to the aircraft stored outdoors during periods of strong gusty winds in severe weather.

2. An aircraft control locking apparatus as recited in claim 1, wherein said first connecting means is a control yoke bracket that include:

a) an L-shaped control shaft engagement member with an upstanding leg having a U-shaped slot therein to bear against the underside of the control shaft; and b) a pair of hook-shaped members to hook onto the control yoke, with each pivotally connected to the other leg of said control shaft engagement member and having an eyelet for receiving a hook member which is affixed to the upper end of one said elastic shock cord.

3. An aircraft control locking apparatus as recited in claim 2, wherein said second connecting means is an instrument panel bracket that includes a plate having a pair of upwardly extending rear flanges to fit under the instrument panel and a pair of front eyelet for receiving a hook member which is affixed to the lower ends of said elastic shock cords.

* * * * *